United States Patent
Demmer

(10) Patent No.: US 8,359,136 B2
(45) Date of Patent: Jan. 22, 2013

(54) ELECTROMECHANICAL PARKING BRAKE FOR A MOTOR VEHICLE

(75) Inventor: Stefan Demmer, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 260 days.

(21) Appl. No.: 12/692,075

(22) Filed: Jan. 22, 2010

(65) Prior Publication Data

US 2010/0121547 A1    May 13, 2010

Related U.S. Application Data

(63) Continuation of application No. PCT/EP2008/005974, filed on Jul. 22, 2008.

(30) Foreign Application Priority Data

Aug. 10, 2007 (DE) .......................... 10 2007 037 685

(51) Int. Cl.
*B60R 25/08* (2006.01)

(52) U.S. Cl. ..... 701/34.4; 701/29.1; 180/287; 307/10.2; 307/10.3; 340/426.1; 340/426.11; 340/426.18; 340/426.32

(58) Field of Classification Search .................. 701/34; 180/287; 307/10.2, 10.3, 10.4, 10.5; 340/426.1, 340/426.11, 426.18, 426.32, 428
See application file for complete search history.

(56) References Cited

U.S. PATENT DOCUMENTS

| | | | |
|---|---|---|---|
| 4,519,653 A * | 5/1985 | Smith | 303/89 |
| 5,624,352 A | 4/1997 | Smale | |
| 5,675,190 A | 10/1997 | Morita | |
| 6,709,069 B2 | 3/2004 | Riddiford et al. | |
| 7,052,093 B2 * | 5/2006 | Suzuki et al. | 303/20 |
| 7,173,348 B2 * | 2/2007 | Voda et al. | 307/10.2 |
| 7,315,236 B2 * | 1/2008 | Yanagida et al. | 340/425.5 |
| 7,699,751 B2 * | 4/2010 | Barber et al. | 477/197 |
| 2003/0227381 A1 * | 12/2003 | Best, Jr. | 340/531 |
| 2004/0204806 A1 * | 10/2004 | Chen et al. | 701/36 |

(Continued)

FOREIGN PATENT DOCUMENTS

BE    1007496 A6    7/1995

(Continued)

OTHER PUBLICATIONS

Pope, B., "TRW Developing Anti-theft Electric Parking Brake," Ward's Auto World, vol. 43, No. 12, p. 6, Dec. 2007.*

(Continued)

*Primary Examiner* — Thomas Black
*Assistant Examiner* — Peter D Nolan
(74) *Attorney, Agent, or Firm* — Crowell & Moring LLP

(57) ABSTRACT

An electromechanical parking brake for a motor vehicle is provided. The electromechanical parking brake includes an operating element that operates a wheel brake, a central control unit that provides an electric supply to the operating element via at least one supply line, an electric actuating unit for interrupting the supply to the operating element, and a control line that connects the central control unit with the electric actuating unit. The operating element and the electric actuating unit are arranged at the motor vehicle in a manner protected against external manual access. The central control unit controls the electric actuating unit via the control line in order to interrupt the supply to the operating element or to reestablish the supply to the operating element. The central control unit also monitors the control line to detect a manipulation of the control line.

20 Claims, 2 Drawing Sheets

U.S. PATENT DOCUMENTS

2006/0090204 A1* 4/2006 Ogiso .............................. 726/22

FOREIGN PATENT DOCUMENTS

| DE | 43 26 514 A1 | 2/1995 |
|---|---|---|
| DE | 196 36 080 A1 | 3/1997 |
| DE | 299 01 871 U1 | 6/1999 |
| DE | 102 06 786 A1 | 9/2003 |
| DE | 102 53 211 A1 | 4/2004 |
| WO | WO 93/13968 A1 | 7/1993 |

OTHER PUBLICATIONS

International Search Report dated Oct. 10, 2008 w/English translation (four (4) pages).

German Search Report dated Jul. 22, 2008 w/partial English translation (nine (9) pages).

* cited by examiner

ELECTROMECHANICAL PARKING BRAKE FOR A MOTOR VEHICLE

CROSS-REFERENCE TO RELATED APPLICATIONS

This application is a continuation of PCT International Application No. PCT/EP2008/005974, filed Jul. 22, 2008, which claims priority under 35 U.S.C. §119 from German Patent Application No. DE 10 2007 037 685.7, filed Aug. 10, 2007, the entire disclosures of which are herein expressly incorporated by reference.

BACKGROUND AND SUMMARY OF THE INVENTION

Apparatuses and methods consistent with the present invention relate to an electromechanical parking brake for a motor vehicle. The electromechanical parking brake has an operating element for operating a wheel brake and a central control unit for providing an electric supply to the operating element via at least one supply line.

From German Patent Document DE 102 06 786 A1, it is known to use an electrically controllable brake of a motor vehicle as a protection device against theft of the motor vehicle. German Patent Document DE 102 06 786 A1 mentions a parking brake as an example of such an electrically controllable brake.

The effective use of electrically controllable brakes as a protection device against theft requires that measures are provided for preventing or hindering a bypassing or canceling of the protection against theft.

It is an object of the invention to provide a simple electromechanical parking brake that is suitable for use as a protection device against theft.

According to an aspect of the present invention, there is provided an electromechanical parking brake for a motor vehicle. The electromechanical parking brake includes an operating element that operates a wheel brake, a central control unit that provides an electric supply to the operating element via at least one supply line, an electric actuating unit for interrupting the supply to the operating element, and a control line that connects the central control unit with the electric actuating unit. The operating element and the electric actuating unit are arranged at the motor vehicle in a manner protected against external manual access. The central control unit controls the electric actuating unit via the control line in order to interrupt the supply to the operating element or to reestablish the supply to the first operating element. The central control unit monitors the control line to detect a manipulation of the control line.

The supply to the operating element may include at least one of a power supply and a voltage supply.

The parking brake can be used as a protection device against theft if an operation of the wheel brake for securing the vehicle is triggered such that this operation can be canceled only by an authorized user. The operation of the wheel brake for securing the vehicle can also be triggered automatically when no electricity is supplied to the operating element.

To avoid bypassing or canceling such a protection against theft, an unauthorized user must not be able to apply a voltage to the operating element or impress a current into the operating element, such that the operation of the wheel brake is canceled. In the case of many related art electromechanical parking brakes, the reversal of the polarity of a voltage typically applied to the supply line when the wheel brake is operated will be sufficient for canceling an operation of the wheel brake. Alternatively, while the wheel brake is operated, the application of a voltage when typically no voltage is applied to the supply line will be sufficient for canceling an operation of the wheel brake.

According to exemplary embodiments of the invention, the operating element, together with an electric actuating unit for interrupting the supply to the operating element, is arranged on the motor vehicle such that it is protected from external manual access. For this purpose, the electric actuating unit may be arranged directly at the operating element. The two may also be constructionally integrated, particularly in a single common constructional unit, in order to avoid a possibly touchable line connection between the electric actuating unit and the operating element. However, should such a line connection between the electric actuating unit and the operating element exist, a manual access to this line connection may be prevented, in that the line connection is also arranged at the motor vehicle in a manner protected from an external manual access.

The operating element may be constructed such that it remains in a condition in which the wheel brake is operated or active after an operation of the wheel brake without any electric supply, and also when the electric supply is interrupted by the electric actuating unit.

The application of a voltage or a current to the supply line "before" the electric actuating unit, i.e. between the central control unit and the electric actuating unit, therefore remains without consequences when the electric actuating unit does not forward the voltage or the current to the operating element.

For permitting a controlling of the electric actuating unit by the central control unit, the electric actuating unit is connected with the central control unit via a control line. By way of this control line, the electric actuating unit can be controlled by the central control unit in order to cause an interruption of the supply to the operating element or in order to cancel such an interruption; i.e., to reestablish the supply to the operating element. In the simplest case, the electric actuating unit is constructed as a relay or an electronic switch, and can be switched by the application of a voltage to the control line. However, the electric actuating unit may also include a circuit for the analysis of electric signals on the control line. It may then be necessary to transmit a certain pulse sequence or a certain code from the central control unit via the control line to the electric actuating unit in order to switch the latter. Such a code may be changed particularly as a function of the time and/or the event.

The electric actuating unit therefore is to be controlled by the central control unit via the control line. In order to counteract a theft of the motor vehicle, the central control unit can have devices for checking the use authorization of a vehicle user, and may communicate with such devices. The central control unit can then control the electric actuating unit only in the case of a corresponding authorization of the vehicle user such that the interruption of the supply line will be canceled. Or, in the event of a lack of such an authorization, the central control unit can control the electric actuating unit such that the supply line will be interrupted.

In order to prevent or hinder a bypassing or canceling of this protection against theft, the central control unit can carry out a monitoring of the control line for recognizing a manipulation of the control line.

The monitoring of the control line may include, for example, an absolute or relative determination of the voltage level on the control line. For this purpose, the control unit is preferably constructed such that voltage changes that are not caused by the central control unit itself can be detected. While taking into account further prerequisites as required, these voltage changes can then be classified as signs of a manipulation.

Provided that several, such as two, wheel brakes, each with the pertaining operating element, the pertaining supply line, the pertaining electric actuating unit, and the pertaining control line, are connected to the control unit in the described manner, a corresponding line monitoring of the respective control line can be carried out individually.

As an alternative, particularly in the case of two wheel brakes connected in this manner, the line monitoring can be carried out such that the voltages are tapped at both control lines and are analyzed in a bridge circuit. In this fashion, only a single measuring line for monitoring two control lines may extend to the central control unit, and the central control unit needs only one measuring input for this purpose. In particular, the bridge circuit or its currents typically converted to a bit sequence can be monitored by a processor of the central control unit, and implausible current values can be used as an indicator of a manipulation. By monitoring the currents or their sum via two precision resistors in the bridge circuit, the plausibility can be checked as to whether the sum and the direction of the currents are inherently correct.

Other analyzing methods by which voltage values of both control lines are tapped and are converted to a single measured quantity in an analyzing circuit may be advantageous.

According to an exemplary embodiment of the present invention, the control line has a two-wire construction in which both wires are mutually insulated in the course of the control line but are connected with one another in an electrically conductive manner within the electric actuating unit. When both wire ends are undamaged, the two wire ends on the side of the central control unit are mutually short-circuited, and a circuit loop is applied to the central control unit. A possible cutting of one of the wires of the control line can therefore be detected by checking the integrity of this circuit loop. For this purpose, a monitoring signal can be fed into one of the wires and its status can be measured at the other wire. If, despite the feeding, the monitoring signal is not measured or is only measured in a changed manner, this can be classified as a sign of a manipulation of the control line.

The above-mentioned monitoring signal may have a low amplitude that is not sufficient for controlling the electric actuating device and is superimposed on the actual control signal for controlling the electric actuating device. In order to ensure a particularly good protection, the monitoring signal can, for example, be generated on the basis of the values of a random sequence generator at the central control unit.

Provided that several, such as two, wheel brakes, each with the pertaining operating element, the pertaining supply line and the pertaining electric actuating unit are connected to the control unit, such a two-wire control line can be provided for each wheel brake, and this type of line monitoring for each of these controls can take place in an individual manner. As an alternative, a common "looped-through" control line can control the actuating units of both wheel brakes. In particular, such a common looped-through control line can be guided as a circuit loop via the two electric actuating units. The integrity of this circuit loop can then be monitored as described above in that a monitoring signal is fed into one end of the circuit loop and its status is measured at the other end. Thus, in contrast to separate two-wire monitored control lines, a control and monitoring logic at the central control unit can be saved.

According to an exemplary embodiment of the present invention, a theft warning can be emitted by the central control unit when a manipulation of the control line is detected.

For this purpose, the central control unit can be connected with an alarm system of the motor vehicle. The central control unit can be constructed such that, when a manipulation of the control line is detected, a theft warning message can be emitted from the central control unit to the alarm system. The alarm system can be activated upon receiving such a theft warning message.

The central control unit may also have devices for generating acoustically and/or visually perceivable alarm signals that can be activated when a manipulation of the control line is detected.

As an alternative or in addition, the central control unit may be suitable for initiating a message to an authorized vehicle user, particularly to the owner, when a manipulation of the control line is detected, such as by sending a message to the vehicle user's mobile telephone. For this purpose, the central control unit may be equipped or connected with a corresponding transmitting unit. The number of the mobile telephone can also be stored in a memory unit of the central control unit. The police or a security service provider can also be informed directly by the central control unit. Within the scope of providing such information, vehicle-specific data can also be transmitted, such as the vehicle and chassis type identification number of the motor vehicle and/or a vehicle designation of the motor vehicle.

If several of the above-mentioned measures are provided for the monitoring of the control line and/or several control lines are monitored, a multi-step warning process can also be used for avoiding false alarms. Thus, for example, no theft warning may be emitted when a monitoring signal is absent on the control line of a single wheel brake. Instead, an input into a fault memory can be initiated. It is only when the monitoring signal on the control line of another wheel brake of the same motor vehicle also remains absent that a theft warning will be emitted.

The operating element may be constructed as an actuator, which advantageously allows a known electromechanical parking brake to be easily adapted for the exemplary embodiments described herein. The operating element may be constructionally integrated with the electric actuating unit in a single constructional unit. No touchable line connection will then exist between the two.

The central control unit can be functionally integrated in an existing control device of the motor vehicle. As a separate construction, it can then be arranged at any point in the motor vehicle. For example, the central control unit may be arranged on a caliper of the motor vehicle that is part of the parking brake.

Other objects, advantages, and novel features of the present invention will become apparent from the following detailed description of one or more exemplary embodiments when considered in conjunction with the accompanying drawings.

DETAILED DESCRIPTION OF THE DRAWINGS

Figure 1:
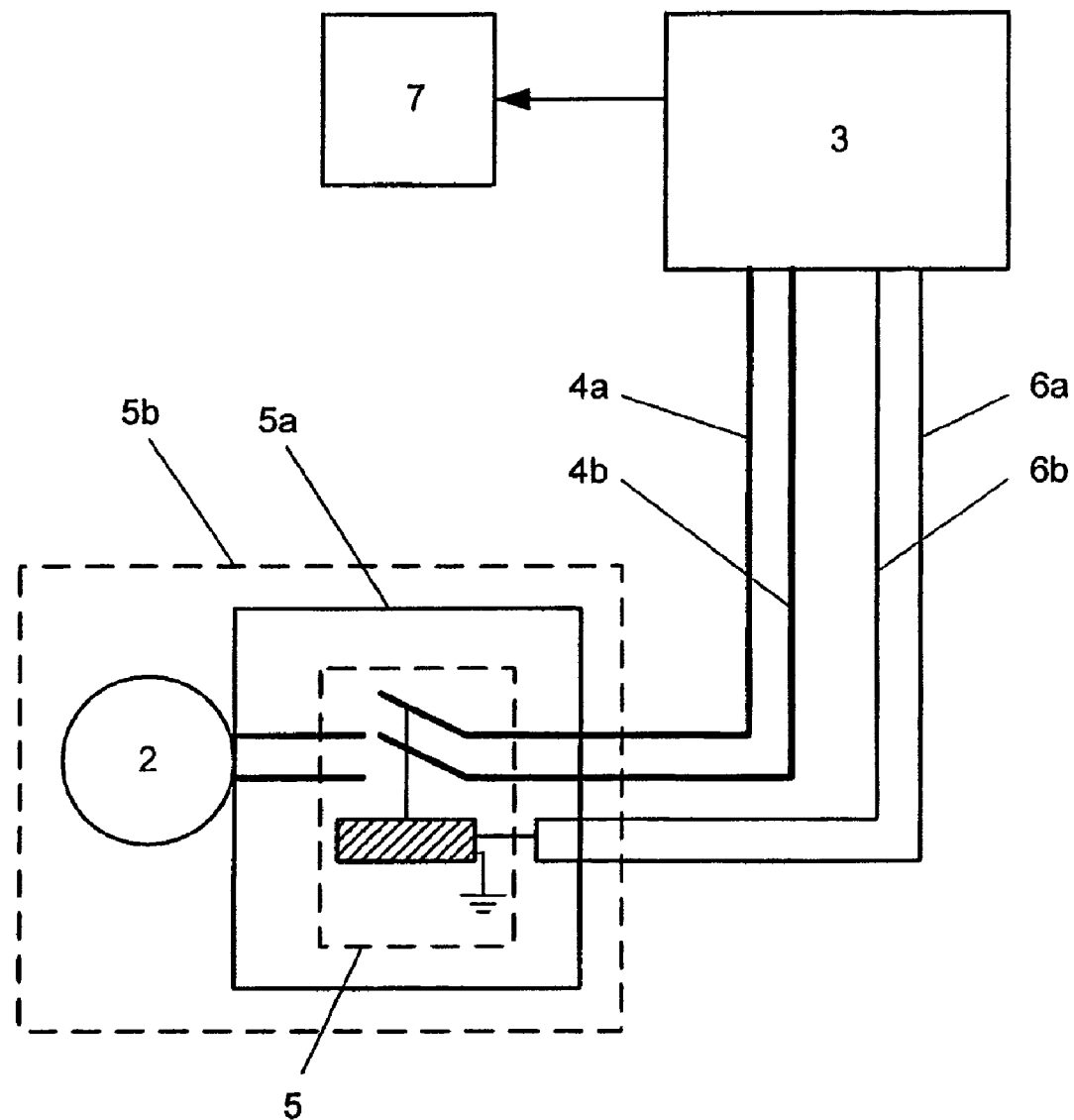
FIG. 1 is a schematic view of a first electromechanical parking brake according to an exemplary embodiment of the invention.

FIG. 1 schematically illustrates an electromechanical parking brake for a motor vehicle.

The electromechanical parking brake has an actuator 2 for operating a wheel brake and a central control unit 3 for supplying electricity to the actuator 2 via a supply line. In the present exemplary embodiment, the supply line is constructed as a pair of lines 4a, 4b.

By operating the wheel brake, a rolling of the corresponding wheel can be prevented and/or the rolling behavior of the motor vehicle can be made conspicuous.

The actuator 2 serving as an operating element, together with an electric actuating unit 5a which contains a relay 5 and can be used for interrupting the supply of the operating element, is arranged at the motor vehicle in a manner protected from external manual access. For this purpose, the actuator 2, together with the electric actuating unit 5a, is integrated in a single constructional unit 5b that cannot be opened without being destroyed.

The relay 5 is connected with the central control unit 3 via a control line 6a, 6b. The relay 5 can be controlled by the central control unit 3 via the control line 6a, 6b in order to cause an interruption of the supply to the actuator 2. For this purpose, a corresponding voltage is applied to the control line 6a, 6b in order to open the relay 5. A monitoring of the control line 6a, 6b is used for recognizing a possible manipulation of the control line 6a, 6b. The control line 6a, 6b has a two-wire construction. The two wires 6a and 6b of the control line are electrically connected with one another only within the electric actuating unit 5a. Thus, a monitoring voltage can be fed into the first wire 6a by the central control unit 3, while a measurement is carried out by the central control unit 3 at the second wire 6b in order to determine whether the monitoring voltage is applied to this second wire 6b in an unchanged condition. With respect to its amplitude, the monitoring voltage is dimensioned such that it does not lead to the switching of the relay 5.

When the monitoring voltage is fed in at the first wire 6a but is not indicated at the second wire 6b, the central control unit 3 will trigger the activation of an alarm system 7 of the motor vehicle.

Figure 2:
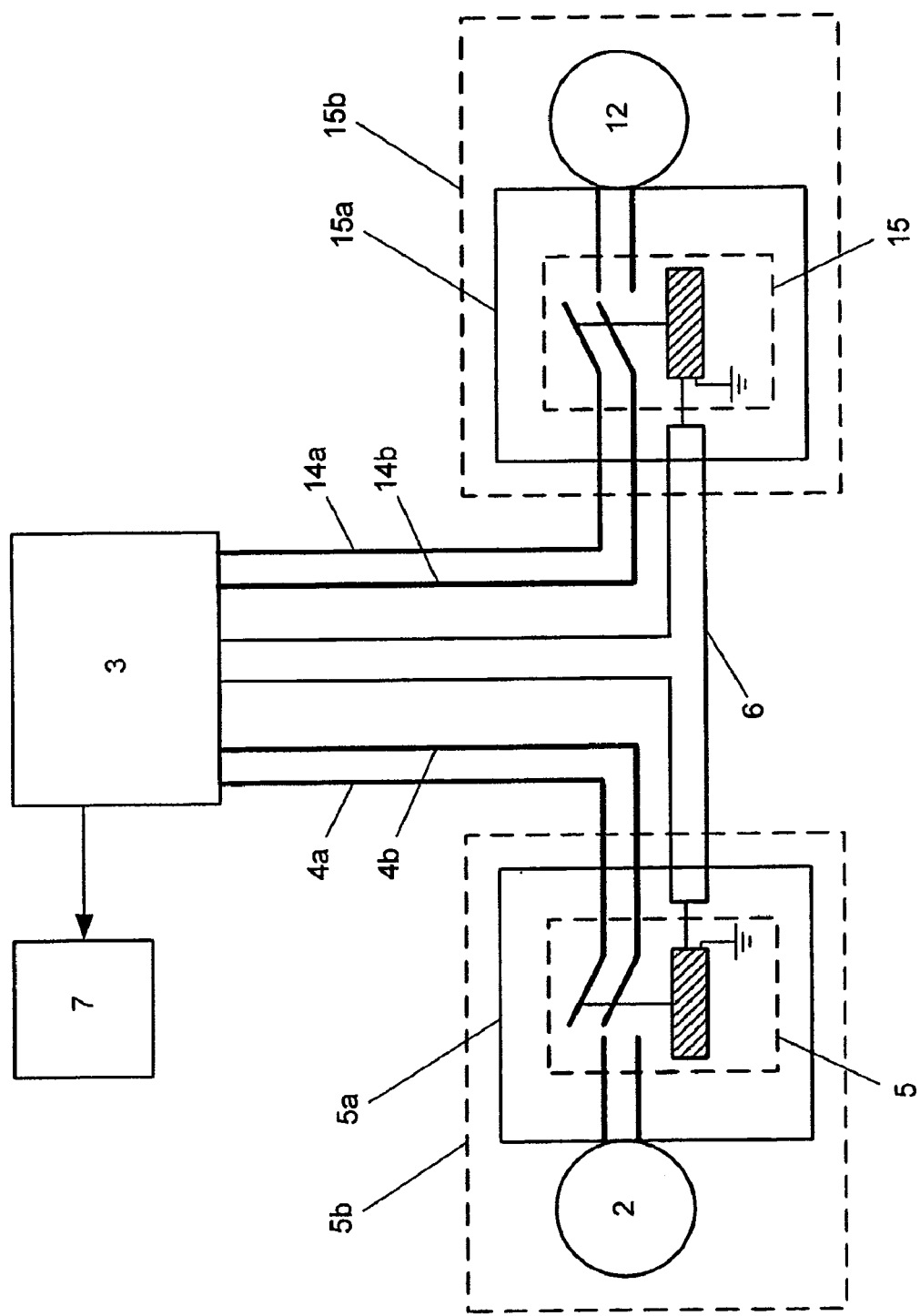
FIG. 2 is a schematic view of a second electromechanical parking brake according to an exemplary embodiment of the invention.

The parking brake illustrated in FIG. 2 essentially corresponds to that of FIG. 1 but two wheel brakes are supplied and controlled according to an exemplary embodiment of the invention.

The reference numbers 2, 3, 4a, 4b, 5, 5a, 5b, and 7 and the corresponding elements of the parking brake essentially correspond to those of FIG. 1. In addition, a second wheel brake is provided which has an actuator 12 than can be supplied via a supply line 14a, 14b.

The actuator 12 serving as an operating element, together with an electric actuating unit 15a which contains a relay 15 and can be used for interrupting the supply of the operating element, is arranged at the motor vehicle in a manner protected from external manual access. For this purpose, the actuator 12, together with the electric actuating unit 15a, is integrated in a single constructional unit 15b that cannot be opened without being destroyed.

The actuating units 5a and 15a of both wheel brakes can be controlled by the central control unit 3 via a common "looped-through" control line 6. The control line 6 is guided as a circuit loop via the two electric actuating units 5a and 15a. The integrity of this circuit loop can be monitored in that a monitoring signal is fed into one end of the circuit loop at the central control unit 3 and its status is measured at the other end.

The foregoing disclosure has been set forth merely to illustrate exemplary embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electromechanical parking brake for a motor vehicle, the electromechanical parking brake comprising:
    a first operating element that operates a first wheel brake;
    a central control unit that provides an electric supply to the first operating element via at least one first supply line,
    a first electric actuating unit for interrupting the supply to the first operating element; and
    a first control line that connects the central control unit with the first electric actuating unit; wherein:
    the first operating element and the first electric actuating unit are arranged at the motor vehicle in a manner protected against external manual access,
    the central control unit controls the first electric actuating unit via the first control line in order to interrupt the supply to the first operating element or to reestablish the supply to the first operating element, and
    the central control unit monitors the first control line to detect a manipulation of the first control line.

2. The electromechanical parking brake according to claim 1, wherein the first operating element is constructed as an actuator.

3. The electromechanical parking brake according to claim 1, wherein the first electric actuating unit is constructed as a relay.

4. The electromechanical parking brake according to claim 1, wherein the first operating element is integrated together with the first electric actuating unit in a single constructional unit.

5. The electromechanical parking brake according to claim 1, wherein the central control unit emits a theft warning if a manipulation of the first control line is detected.

6. The electromechanical parking brake according to claim 5, wherein the central control unit is connected with an alarm system of the motor vehicle, and the alarm system receives the theft warning if the manipulation is detected.

7. The electromechanical parking brake according to claim 5, wherein the central control unit comprises devices that generate at least one of acoustically perceivable alarm signals and visually perceivable alarm signals, and the devices are activated if a manipulation of the first control line is detected.

8. The electromechanical parking brake according to claim 5, wherein the central control unit initiates providing of a message to an authorized vehicle user.

9. The electromechanical parking brake according to claim 1, wherein the first control line comprises at least two wires, and the central control unit monitors a manipulation of each wire of the first control line.

10. The electromechanical parking brake according to claim 1, further comprising:
    a second operating element that operates a second wheel brake;
    a second electric actuating unit for interrupting an electric supply to the second operating element; and
    a second control line that connects the central control unit with the second electric actuating unit, wherein:
    the central control unit provides the supply to the second operating element via at least one second supply line,
    the second operating element and the second electric actuating unit are arranged at the motor vehicle in a manner protected against external manual access,
    the central control unit controls the second electric actuating unit via the second control line in order to interrupt the supply to the second operating element or to reestablish the supply to the second operating element, the central control unit monitors the second control line to detect a manipulation of the second control line, and voltage values of both control lines are tapped and are converted to a single measured quantity in an analyzing circuit.

11. The electromechanical parking brake according to claim 1, further comprising:

a second operating element that operates a second wheel brake;

a second electric actuating unit for interrupting an electric supply to the second operating element; wherein:

the central control unit provides the supply to the second operating element via at least one second supply line, the second operating element and the second electric actuating unit are arranged at the motor vehicle in a manner protected against external manual access, the first control line is a common looped-through line that connects the first electric actuating unit and the second electric actuating unit, and the central control unit controls the second electric actuating unit via the first control line in order to interrupt the supply to the second operating element or to reestablish the supply to the second operating element.

12. A method of operating an electromechanical parking brake, the method comprising the acts of:

controlling, by a central control unit, an electric actuating unit via a control line that connects the central control unit with the electric actuating unit, in order to interrupt an electric supply to an operating element that operates a wheel brake or to reestablish the electric supply to the operating element; and monitoring, by the central control unit, the control line to detect a manipulation of the control line, wherein the electromechanical parking brake includes the operating element, the central control unit, and the electric actuating unit.

13. The method according to claim 12, further comprising the act of emitting a theft warning message if the manipulation of the control line is detected.

14. The method according to claim 13, further comprising the act of activating an alarm system upon receiving the theft warning message.

15. The method according to claim 12, further comprising the act of generating at least one of acoustically perceivable alarm signals and visually perceivable alarm signals if the manipulation of the control line is detected.

16. The method according to claim 12, further comprising the act of providing a message to an authorized vehicle user if the manipulation of the control line is detected.

17. The method according to claim 16, wherein the message includes at least one of a vehicle and chassis type identification number of the motor vehicle and a vehicle designation of the motor vehicle.

18. The method according to claim 12, wherein the monitoring of the control line comprises the act of determining at least one of an absolute voltage level and a relative voltage level on the control line.

19. The method according to claim 12, wherein the control line includes a first wire and a second wire, and the monitoring of the control line comprises the acts of feeding a monitoring signal into the first wire and measuring the monitoring signal at the second wire.

20. A method of operating an electromechanical parking brake that includes an operating element that operates a wheel brake and a central control unit that provides an electric supply to the operating element via a supply line, the method comprising the acts of:

controlling an electric actuating unit via a control line that connects the central control unit with the electric actuating unit, in order to interrupt the supply to the operating element or to reestablish the supply to the operating element; and monitoring the control line to detect a manipulation of the control line, wherein the control line includes a first wire and a second wire, and the monitoring of the control line comprises the acts of feeding a monitoring signal into the first wire and measuring the monitoring signal at the second wire.

* * * * *